United States Patent
Aalto

(10) Patent No.: US 11,733,460 B2
(45) Date of Patent: Aug. 22, 2023

(54) DEVICES AND METHODS FOR POLARIZATION SPLITTING

(71) Applicant: Teknologian tutkimuskeskus VTT Oy, Espoo (FI)

(72) Inventor: Timo Aalto, Espoo (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 117 days.

(21) Appl. No.: 17/290,779

(22) PCT Filed: Oct. 31, 2019

(86) PCT No.: PCT/FI2019/050777
§ 371 (c)(1),
(2) Date: May 3, 2021

(87) PCT Pub. No.: WO2020/089530
PCT Pub. Date: May 7, 2020

(65) Prior Publication Data
US 2022/0003934 A1   Jan. 6, 2022

(30) Foreign Application Priority Data
Nov. 2, 2018   (FI) .................................... 20185932

(51) Int. Cl.
*G02B 6/293*   (2006.01)
*G02F 1/225*   (2006.01)
(Continued)

(52) U.S. Cl.
CPC ......... *G02B 6/29302* (2013.01); *G02B 6/105* (2013.01); *G02B 6/126* (2013.01);
(Continued)

(58) Field of Classification Search
CPC .......... G02B 6/10; G02B 6/105; G02B 6/125; G02B 6/126; G02B 6/29302;
(Continued)

(56) References Cited

U.S. PATENT DOCUMENTS 6,563,965 B1 * 5/2003 Al-hemyari ........ G02B 6/12007
  385/39
7,408,641 B1   8/2008 Kwak et al.
(Continued)

FOREIGN PATENT DOCUMENTS

CA   2347546 A1   11/2002
CN   1544967 A    11/2004
(Continued)

OTHER PUBLICATIONS

Sainov et al: Interferometer based on total internal reflection. Applied Optics, Optical Society of America, Jun. 1, 1995, vol. 34, No. 16, pp. 2848-2852.

*Primary Examiner* — Daniel Petkovsek
(74) *Attorney, Agent, or Firm* — Laine IP Oy

(57) ABSTRACT

The invention relates to devices and methods for polarization splitting, where a first optical coupler having at least one input port which receives an input light beam, and at least two output ports at which said light beam, is split into at least a first and a second arms at a first end of said arms. At least one total internal reflection mirror is coupled to the second arm for inducing polarization-dependent phase shifts to the light beam propagating in the second arm, and a polarization-dependent phase difference between the second and the first arm. A second optical coupler having input ports is coupled to the second and opposite ends of the arms. The second coupler has at least one first output port at which light is coupled from said arms, so that the polarization-dependent phase shift of the at least one total internal
(Continued)

reflection mirror causes polarization-dependent coupling of light from said input port to said output port.

17 Claims, 5 Drawing Sheets

(51) Int. Cl.
*G02B 6/10* (2006.01)
*G02B 6/126* (2006.01)
*G02F 1/21* (2006.01)
*G02B 6/125* (2006.01)

(52) U.S. Cl.
CPC ......... *G02B 6/29352* (2013.01); *G02F 1/225* (2013.01); *G02B 6/125* (2013.01); *G02F 1/212* (2021.01)

(58) Field of Classification Search
CPC ...... G02B 6/29352; G02B 5/30; G02B 27/28; G02F 1/212; G02F 1/225
See application file for complete search history.

(56) References Cited

U.S. PATENT DOCUMENTS

| | | | |
|---|---|---|---|
| 7,822,298 B2* | 10/2010 | Rasras | .................... G02F 1/225 385/11 |
| 8,004,749 B1 | 8/2011 | Hsieh et al. | |
| 8,983,244 B2* | 3/2015 | Shen | .................... H04B 10/677 385/39 |
| 2003/0152304 A1 | 8/2003 | Gonthier et al. | |
| 2005/0201686 A1 | 9/2005 | Cole et al. | |
| 2007/0223932 A1 | 9/2007 | Hsieh | |
| 2011/0176144 A1* | 7/2011 | Chen | .................... H04B 10/677 356/521 |
| 2012/0257206 A1 | 10/2012 | Wang et al. | |
| 2014/0355979 A1 | 12/2014 | Dorin et al. | |
| 2016/0341538 A1 | 11/2016 | Tumlinson et al. | |

FOREIGN PATENT DOCUMENTS

| | | | | |
|---|---|---|---|---|
| CN | 2842378 Y | | 11/2006 | |
| CN | 106371175 A | | 2/2017 | |
| CN | 109946856 A | * | 6/2019 | ............... G02F 1/01 |
| GB | 2211956 A | | 7/1989 | |

* cited by examiner

DEVICES AND METHODS FOR POLARIZATION SPLITTING

FIELD OF THE INVENTION

The invention relates to photonic circuits, more specifically to devices and methods for polarization splitting in photonic integrated circuits.

BACKGROUND OF THE INVENTION

Optical waveguide splitters (1×N), combiners (N×1) and couplers (M×N) are important devices in integrated optical systems, where light propagates along planar waveguides in photonic integrated circuits (PICs). Here we use the term coupler to refer to any of these devices. Compared with Y-splitters (1×2), Silicon On Insulator (SOI)-based multimode interference (MMI) couplers have a series of advantages including low loss, good uniformity, insensitive to operation wavelength, polarization, temperature and other environmental factors, large bandwidth, simpler fabrication technique, larger tolerance allowed and minimized structure.

These attract significant research work on SOI-based optical integrated circuits with MMI couplers. Directional couplers and adiabatic couplers are alternatives to MMI couplers, but they are less popular due to their more strict fabrication tolerances and longer lengths. As SOI-based optical waveguides have a large refractive index difference between the silicon core and the surrounding cladding (typically silicon dioxide), the optical beam is well-confined in the waveguide, and SOI waveguide devices are thus suitable for dense photonic integrated circuits with small bending radii. A multimode interferometer is essentially a broad waveguide with a number of guided modes (eigenmodes). Each mode $\psi i$ has a propagation constant $\beta i$, and they propagate independently from one another and at a different velocity, depending on the wavelength.

In photonic integrated circuits, the polarization diversity scheme is commonly used to tackle polarization dependency of waveguide components by splitting any input polarization state into its two orthogonal polarization components, which are coupled to two separate output waveguides in a 1×2 polarization splitter, and by rotating the polarization in one of the output waveguides to achieve the same polarization state in both waveguides. Two identical copies of polarization-sensitive photonic structures can then be used to implement the same optical function, such as modulation, filtering or multiplexing. After these optical functions, the optical outputs from the two identical structures can be recombined with the opposite sequence of polarization rotation (for one waveguide) and polarization combining (2×1).

Combined polarization splitter-rotators (PSR) are often used to split/combine the two polarizations into/from two waveguides, and to rotate the polarization in one of the arms by 90 degrees. These have been especially used in waveguides that have small cross-section and high refractive index contrast. Such waveguides often use grating couplers for coupling light from/to optical fibers, and such grating couplers can themselves act as polarization splitter-rotators. Some polarization splitter-rotators are based on the adiabatic (or gradual) transformation of waveguide modes.

Polarization splitters are however difficult to realize in PICs, especially in thick waveguides where adiabatic coupling between waveguides typically requires long coupling lengths. Many polarization splitter concepts are also very wavelength dependent and only work in a narrow wavelength range. One application for polarization splitters is the integration of an isolator or circulator into a PIC. In addition to a Faraday rotator, it requires polarization splitting and 45 degree polarization rotation. It is an object of the present invention to offer a polarization splitter that makes it possible to create phase differences in polarization components propagating in two different interferometer arms, and that is well suited for implementation in photonic integrated circuits.

SUMMARY OF THE INVENTION

The present invention is based on the insertion of total internal reflection (TIR) mirrors into the arms of an asymmetric Mach-Zehnder interferometer (AMZI). An inventive polarization splitter consists of an interferometer that includes an optical coupler with at least two output ports, an optical coupler with at least two input ports, and different TIR mirrors placed into the two different arms of the interferometer. The polarization splitter described can also be used as a polarization combiner, when light is propagating in the reverse direction. An inventive polarization splitter may also be provided with multiple input ports, with more than two interferometer arms, or with more than two output ports, but in the simplest case, it has one input, two arms and two outputs.

The benefits of the invention include that the TIR mirrors that provide predefined polarization-dependent phase shifts are almost independent of wavelength and fabrication tolerances. Polarization-dependency of the TIR mirrors originates from the Fresnel equations and it only depends on wavelength through the dispersion of the waveguide and mirror materials. This allows for making polarization splitters that work over a wide wavelength range and which are easy to design and manufacture.

According to a first aspect of the present invention, an optical device for splitting polarized light comprises:
  a first optical coupler having at least one input port which receives an input light beam, and at least two output ports at which said light beam is split into at least a first and a second arms at a first end of said arms,
  at least one total internal reflection mirror coupled to at least said second arm for inducing polarization-dependent phase shifts to the light beam propagating in said second arm, and a polarization-dependent phase difference between said second and said first arm,
  a second optical coupler having input ports coupled to second and opposite ends of said arms, said second coupler having at least one first output port at which light is coupled from said arms, so that the polarization-dependent phase shift of said at least one total internal reflection mirror causes polarization-dependent coupling of light from said input port to said output port.

Light from both arms is coupled to the second coupler through its input ports, where the two input light beams interfere. Light is then coupled to each output from both arms. Ideally, the TE polarization mode couples to one output only, as the light from the two arms interferes constructively to one output and destructively to the other output. For the TM polarization mode, the interference effect would be the opposite.

According to a second aspect of the present invention, a method for splitting polarization comprises the steps of:
  feeding an input light beam to at least one input port of a first optical coupler having at least two output ports at which said light beam is split into at least a first and a second arm at a first end of said arms, inducing polarization-dependent phase shifts to the light beam propagating in said second arm by at least one total internal reflection in said second arm, thereby inducing a polarization-dependent phase difference between said second and said first arm, receiving light in a second optical coupler having input ports coupled to second and opposite ends of said arms, so that the polarization-dependent phase shift of said at least one total internal reflection mirror causes polarization-dependent coupling of light from said at least one input port to said at least one output port.

According to one embodiment of the invention, a series of total internal reflection mirrors is used to achieve the targeted polarization-dependent phase difference between said arms. According to some embodiments, a series of total internal reflection mirrors may be coupled to said second arm to achieve a polarization-dependent phase difference between said first and second arms, and identical waveguide bends or total internal reflection mirrors are coupled to each arm to optimize the total optical path length of said first and second arms.

A series of total internal reflection mirrors coupled to the second arm may comprise four mirrors, each mirror causing a 45 degree phase shift between the s and p polarizations of the light beam propagating in said second arm.

According to some embodiments, a series of metallic mirrors are coupled to the first arm and a series of total internal reflection mirrors are coupled to the second arm, in order to achieve a polarization-dependent phase difference between the first and second arms. The metallic mirrors and the total internal reflection mirrors may be processed as total identical internal reflection mirrors from the same silicon substrate, and the required metallic mirrors are then metallized from the total internal reflection mirrors.

According to some embodiments, the total optical path length difference between the two arms is no more than 360 degrees for both polarizations.

The inventive device may according to some embodiments be a 1×2 or a 2×2 Mach-Zehnder interferometer where two polarization modes, the TE mode and the TM mode, are coupled from the same input port to two different output ports.

The inventive device may be a polarizer with only one output port in the second optical coupler and only one polarization couples from the same input port of the first optical coupler to that output port of the second optical coupler.

According to some embodiments at least one phase modulator has been added to at least one arm to adjust or calibrate the phase difference between the arms for at least one polarization.

According to some embodiments the device comprises optical waveguides that form a photonic integrated circuit. At least one tapered waveguide section or at least one metallized mirror may be included in at least one arm to at least partly compensate for fabrication imperfections on the TIR mirrors and the resulting impact on path length differences between different arms of the device.

The benefits of the invention include that the inventive polarization splitters work over a wide wavelength range, while being easy to design and fabricate. This is due to that TIR mirrors provide predefined polarization-dependent phase shifts that are almost independent of the wavelength and tolerances in the mirror fabrication, Definitions BOX=Buried oxide, a layer of silicon dioxide that separates the silicon waveguide layer from the silicon substrate underneath.

Max-Zehnder interferometer (MZI)=a device that first splits input light into two interferometer arms and later combines the light from the two arms in such a way that the amount of light coupled into one or multiple outputs depends on the phase difference that is accumulated between the two arms Optical coupler=a device that couples light from one or multiple input ports into one or multiple output ports. In case of multiple input ports, the amplitude and phase of light that is coupled to any output port depends on the amplitude and phase of light entering each of the input ports as the multiple input light beams cause interference in the optical coupler. Optical couplers are typically used to split light into multiple outputs or to combine light from multiple inputs into the same output. They are the basic building blocks of interferometers.

MMI (coupler)=Multimode Interference coupler, a particular example of an optical coupler where light from any input port is coupled into multiple waveguide modes in a multimode waveguide, and interference occurs between those waveguide modes inside the MMI coupler, even with a single input port.

SOI=Silicon On Insulator, a layered silicon-insulator-silicon wafer (in contrast to solid silicon wafer) used in semiconductor manufacturing. Typically silicon dioxide (BOX) is used as the insulator. As part of the fabrication process, the SOI wafer is diced into SOI chips.

TIR=Total Internal Reflection, the reflection of the total amount of incident light at the boundary between two media as dictated by the Fresnel equations.

TE=Transverse electric polarization where electrical field is at least mostly oriented along the surface of the waveguide chip (horizontally in FIG. 1).

TM=Transverse magnetic polarization where electrical field is at least mostly oriented along the normal of the waveguide chip (vertically in FIG. 1).

DETAILED DESCRIPTION OF EMBODIMENTS

Figure 1:
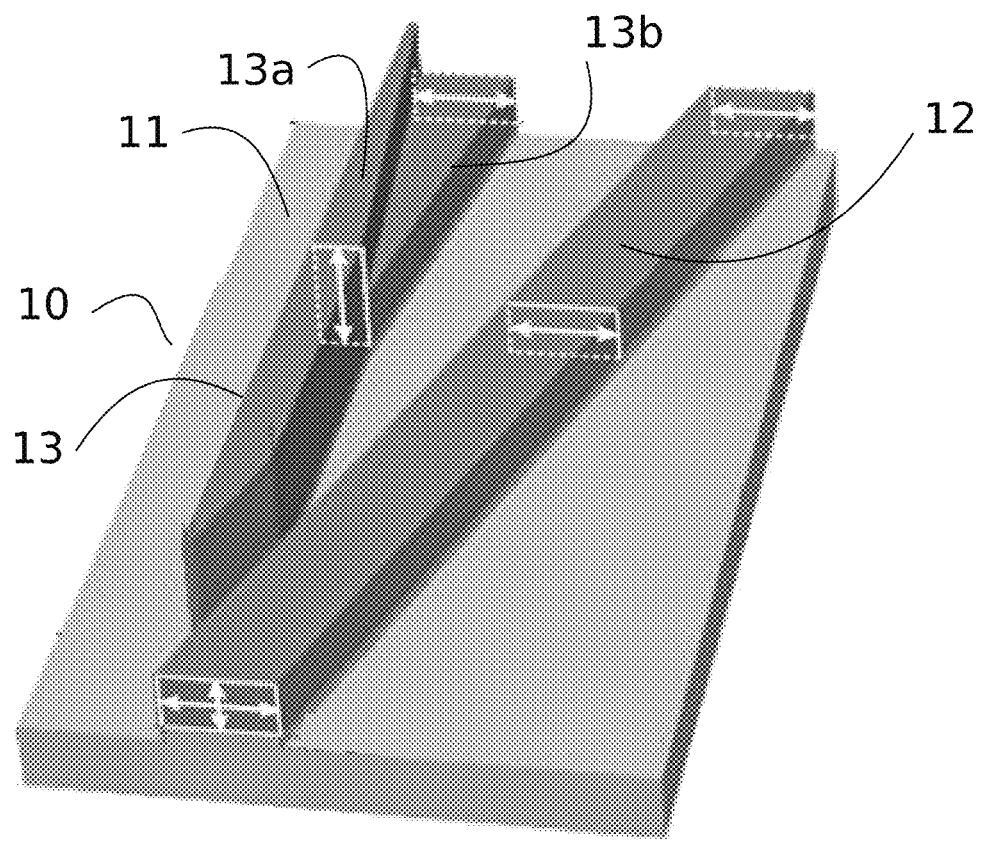
FIG. 1 shows a schematic view of an adiabatic polarization splitter-rotator.

FIG. 1 shows a schematic view of a polarization splitter-rotator 10 on an insulator 11. The arrows depict the orientation of the electric field in the waveguide. The vertically polarized light (TM mode) adiabatically tunnels across the small gap from a flat waveguide 12 to an upright or tall waveguide 13, and the horizontally polarized light (TE mode) remains in the flat waveguide 12. The tall waveguide 13 is adiabatically transformed into another flat waveguide by asymmetrically patterning the upper part 13a with respect to the lower part 13b, demonstrating principle of polarization rotation. The dimensions of this polarization splitter-rotator need to be controlled precisely and the minimum device length for adiabatic operation increases as a function of the waveguide height, making this concept unpractical in several micrometers thick SOI waveguides, for example.

Figure 2:
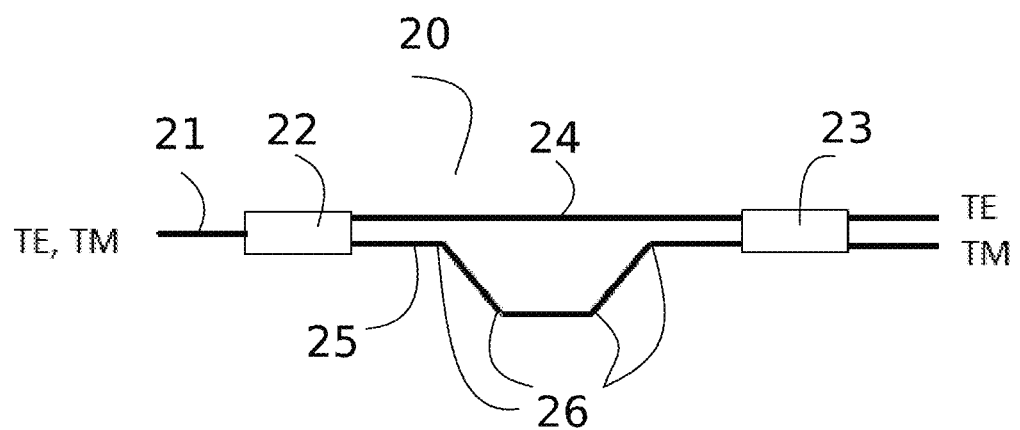
FIG. 2 shows a polarization splitter according to one embodiment of the present invention.

In FIG. 2 is shown an example of a polarization splitter according to the present invention, an asymmetric Mach-Zehnder interferometer 20. In the context of the present invention, a polarization splitter consists of the interferometer 20, that includes a first optical coupler 22 with at least two output ports, and a second optical coupler 23 with at least two input and output ports. Total internal reflection elements, such as waveguide-based TIR mirrors 26, are placed into the different waveguides or "arms" 24, 25 of the interferometer.

In the example of FIG. 2, the first optical coupler 22 has one input port which receives an input light beam 21, and two output ports at which the light beam is split into a first and a second arm 24, 25, respectively, at a first end of the arms. At the opposite other end of the arms 24, 25 the second optical coupler 23 has two input ports that couple light from said first arm and the second arm, respectively, from the two output port of the polarization splitter. Due to the TIR mirrors 26 in the second arm, a polarization-dependent phase difference in the second arm 25 has been induced in the light with respect to the light in the first arm 24. This polarization-dependent phase shift induces polarization-dependent coupling of light into the output ports of the second optical coupler 23.

When the interferometer arms have different number or type of TIR mirrors, the polarization-dependent phase shifts become different in the interferometer arms. This induces polarization-dependent phase difference between the arms. In one embodiment of the invention, the phase difference between two arms is an even multiple of π for one polarization (for example 0 or 2π), and an odd multiple of π for the other polarization (for example π or 3π). In another embodiment of the invention, the phase difference between two arms is +π/2 for one polarization and −π/2 for the other polarization. Adding an integer multiple of 2π to the phase difference at either polarization doesn't change the operation of the polarization splitter. The used type of the first and second optical coupler (22, 23) and the desired splitting ratio of the two polarizations between the two outputs of the second optical coupler (23) dictate the preferred absolute values of the phase difference between the two arms at the two polarizations. Light from the two waveguide arms is coupled to an optical coupler 23 that couples the light into two or more output ports, depending on the amplitude and phase difference of light in each of the interferometer arms.

In one preferred embodiment, the two polarization modes (TE, TM) couple to different output ports, as shown in FIG. 2.

Further to FIG. 2, light is first split by the optical coupler 22 into two waveguide arms. In this example, the first arm 24 is straight, while the second arm 25 includes four identical TIR mirrors 26 in an SOI waveguide. The light in the waveguide 25 with TIR mirrors 26, experiences multiple total internal reflections and polarization-dependent phase shifts to the light. With an angle of incidence to a mirror of 65°, each TIR mirror 26 turns the light horizontally by 50 degrees and causes approximately a 45 degree phase shift between the two polarizations, assuming a silicon core and a silicon dioxide cladding in the arm, see FIGS. 5 and 6. Therefore, the total polarization-dependent phase shift in the arm 25 with the four TIR mirrors is approximately 180 degrees, which causes the two polarization modes TE, TM to be coupled to two different outputs at the optical coupler 23 of the interferometer 20. The physical path length difference between the arms can be optimized by adjusting the lengths of the waveguide sections between the TIR mirrors in order to achieve optimum phase difference between the arms for one polarization. The angle of incidence for each TIR mirror can be varied to adjust the polarization-dependent phase shifts and the direction of the waveguide. By combining these two methods, it is possible to optimize the phase difference between the two arms for both polarizations, and to achieve perfect polarization splitting into the two output waveguides at a given wavelength.

The present invention is thus based on the insertion of total internal reflection elements, such as TIR waveguide mirrors into the two (or more) arms of an interferometer. According to the Fresnel equations concerning polarization dependent phase shifts in total internal reflection (as used in Fresnel rhombs, for example), the phase shift in total internal reflection is different for the two polarizations TE, TM, and the polarization-dependent phase shift is only dependent on wavelength through the dispersion of the used materials, which is typically small in the used wavelength range. This is in contrast to the behavior of a waveplate (also known as a retarder), which directly depends on the thickness of the crystal and the wavelength of light. Therefore, the TIR-based polarization splitter benefits from intrinsically small wavelength dependency in the polarization-dependent phase shifts in the interferometer arms.

Optical couplers can be based on directional couplers, multi-mode interference (MMI) couplers, star couplers or adiabatic couplers, for example, or any cascades of such couplers and delay lines between them. Many optical couplers are themselves wavelength dependent, which is typically due to interferometric effects inside them. More advanced couplers can have a reduced wavelength dependency, which is often beneficial. The polarization splitters described here can naturally also be used as a polarization combiner, when light propagates in reverse direction. There can also be a multitude of input ports in a polarization splitter, for example to realize a 2×2 polarization coupler that operates in bar-state for one polarization and in cross-state for the other polarization. Furthermore, it is possible to use only one input and one output port of an interferometer to realize a polarizer instead of a polarization splitter.

Figure 3:
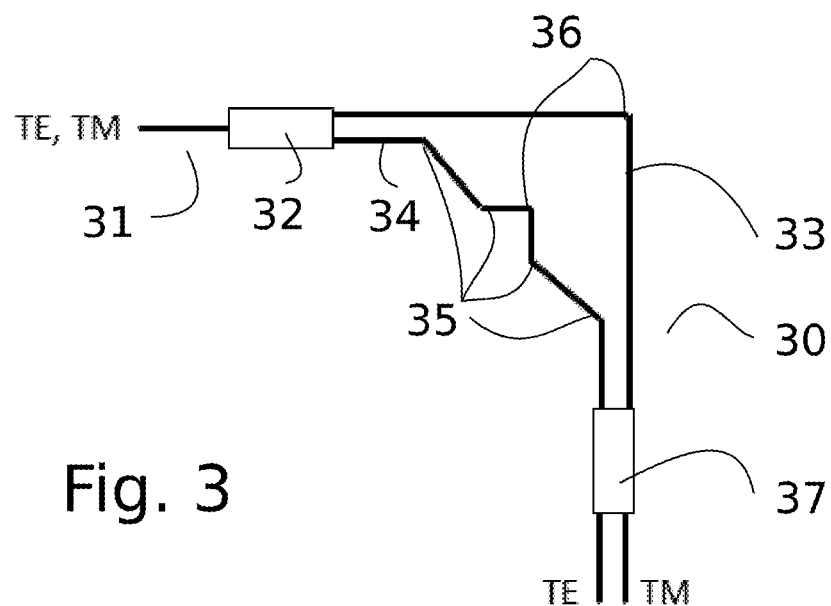
FIG. 3 shows a polarization splitter according to another embodiment of the present invention.

Another embodiment of an inventive polarization splitter 30 having an input 31 and an optical coupler 32, is shown in FIG. 3. Here both arms 33 and 34 have one 90 degree TIR mirror 36, while four identical TIR mirrors 35 are added to the second arm 34, like in the example of FIG. 2. The polarization-dependent phase shift is again 180 degrees higher in the second arm, which causes the two polarizations, TE and TM, to be coupled to the two different outputs of the optical coupler 37. Adding an identical element, such as the 90 degree TIR mirror 36, to both arms of the interferometer doesn't influence its operation. In this example, the physical lengths of the two arms 33 and 34 can be made identical, which allows to minimize the wavelength dependency of the polarization splitter.

Generally, a series of total internal reflection mirrors may be coupled to a second arm 34 to achieve a polarization-dependent phase difference between the first and second arms, and identical waveguide bends or total internal reflection mirrors may be coupled to each arm 33, 34 to optimize the total optical path length of said first and second arms. Even more generally, any number of TIR mirrors, bends, straight sections or other light manipulating elements can be added to each arm of the interferometer to achieve targeted coupling of a given polarization from any input port of the interferometer to any output port of the interferometer. The minimum requirement is that at least one TIR mirror in at least one interferometer arm is used to generate a polarization-dependent phase shift between the interferometer arms to achieve different coupling of two polarizations from one input port to at least one output port.

Figure 4:
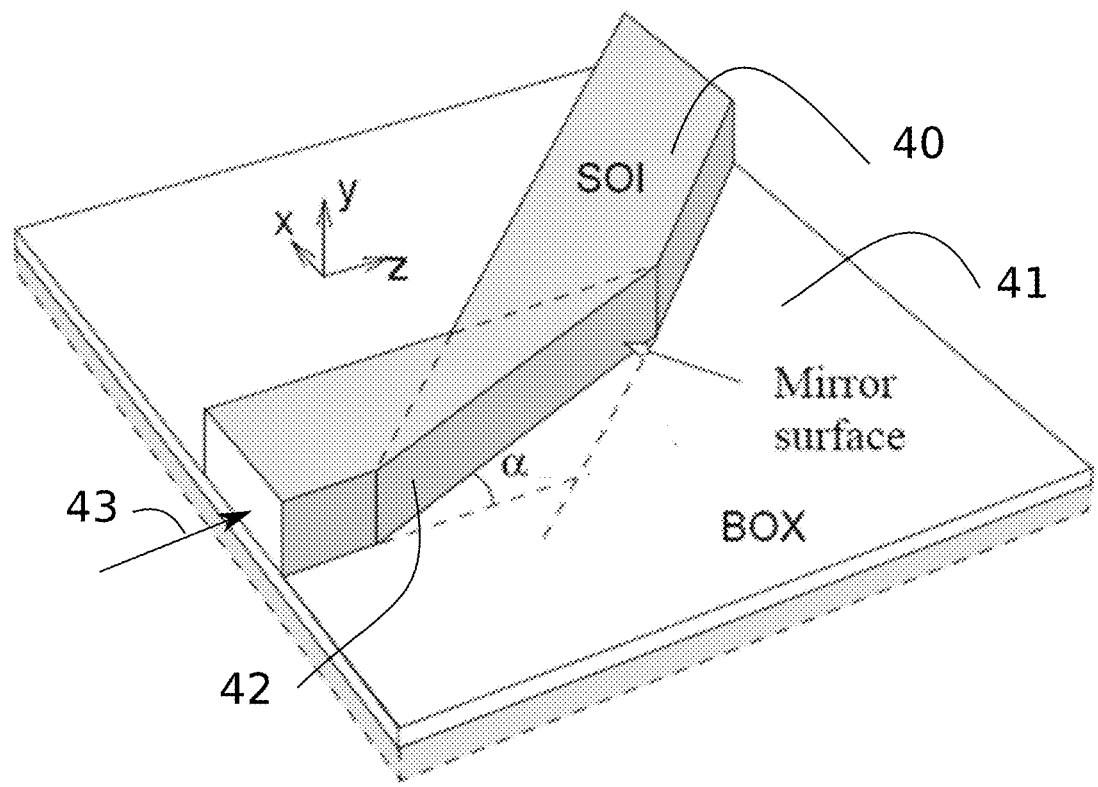
FIG. 4 shows a TIR waveguide mirror that may be used in the present invention.

FIG. 4 shows an exemplary TIR mirror 42 in an SOI strip waveguide 40 on an insulating BOX layer 41. Light propagates mostly inside the rectangular silicon core of the strip waveguide. One benefit of multi-micrometer thick SOI waveguides is that they have almost negligible amount of evanescent light propagating outside the silicon core. Guided light experiences a total internal reflection in the TIR mirror, which causes a polarization-dependent phase shift to the light. The angle of incidence of a light beam 43 with respect to the mirror 42 can be calculated as $90°-\alpha/2$ where $\alpha$ is the change in the direction of light.

Figure 5:
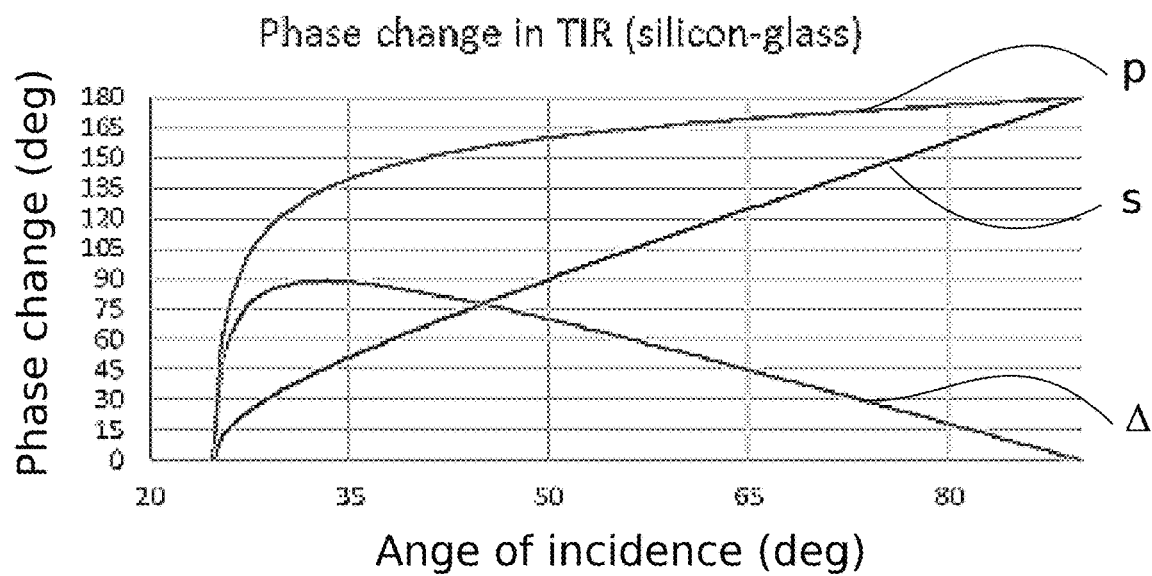
FIG. 5 shows a graph with phase shifts that are induced to polarized light in total internal reflection from the interface between a silicon core and a glass cladding.
Figure 6:
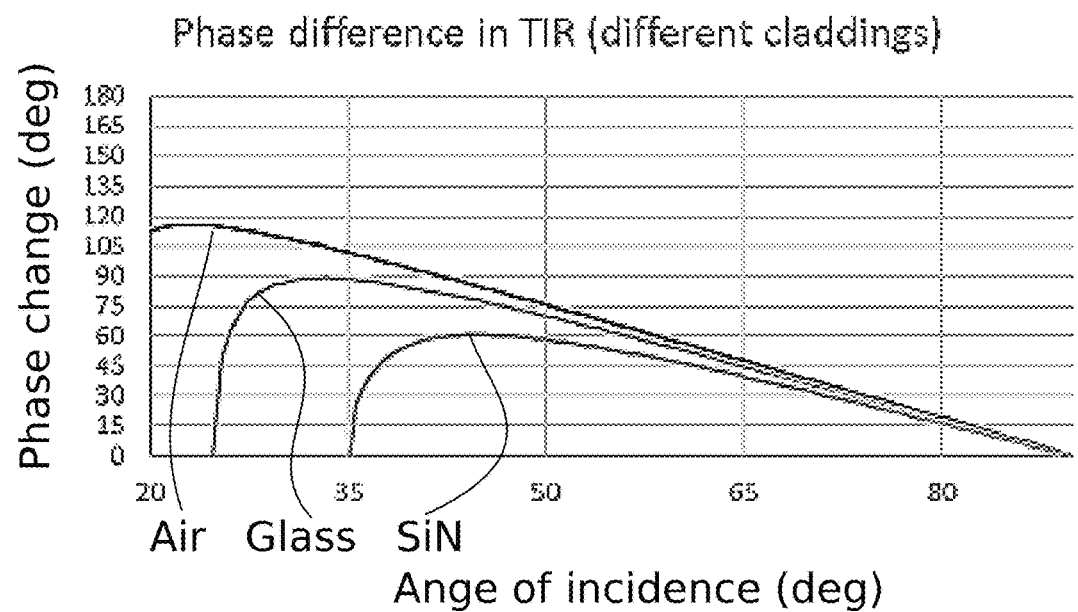
FIG. 6 shows phase shift graphs for different waveguide cladding materials.

The polarization-dependent phase shifts of TIR mirrors are illustrated in FIGS. 5 and 6 as a function of the angle of incidence to the mirror, and for three different cladding materials around the silicon waveguide core.

In FIG. 5 is shown phase shifts that are induced to s and p polarized light in total internal reflection, and the phase difference that is generated between them. In this example case the waveguide core is silicon (n=3.48) and the cladding is silicon dioxide (n=1.46). For a 65° angle of incidence the waveguide turns 45° and the resulting polarization-dependent phase shift is approximately 45° (or $\pi/4$). For the horizontally turning TIR mirror shown in FIG. 4, p (s) polarization in the reflection corresponds to TE (TM) polarization in the waveguide. However, there is no need to limit the invention to the use of horizontal TIR mirrors only.

In FIG. 6 is shown the phase shifts that are induced between s and p polarized light in total internal reflection in three different waveguides, where the waveguide core is always silicon (n=3.48), but the cladding is either Air (n=1), Glass (silicon dioxide, n=1.46) or SiN (silicon nitride, n=2). It should also be noted that the refractive indices correspond to ~1.55 μm wavelength and slightly vary as a function of wavelength due to material dispersion. However, there is no direct impact of wavelength on the induced polarization-dependent phase shift, except for this dispersion.

Figure 7:
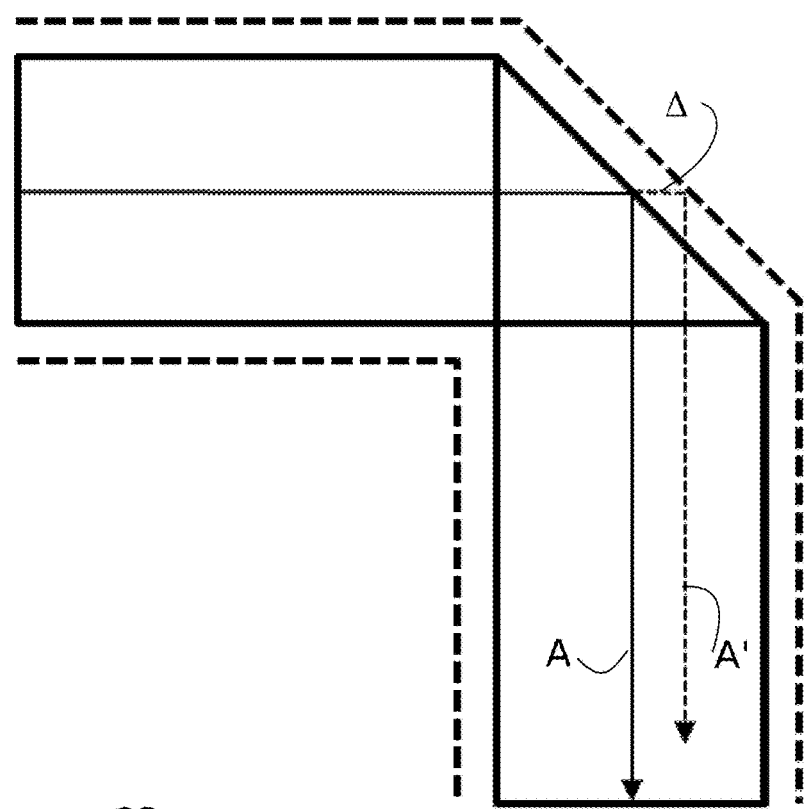
FIG. 7 schematically illustrates the impact of linewidth change on the position of a TIR mirror plane and the resulting path length change for light passing through the TIR waveguide mirror element.

Linewidth change, lithographic misalignment or other imperfections in the fabrication process may cause an unwanted shift $\Delta$ in the position of a TIR mirror plane with respect to the optical axis A of the waveguide coupled to the TIR mirror, as illustrated in FIG. 7. An unwanted shift in the position of the TIR mirror plane will lead to an unwanted shift A' in the optical path length in the arm where that TIR mirror is placed. Typically, such a shift in the optical path length is the same for both polarizations.

There may also be a small lateral shift in light propagation, but if the shift in the TIR mirror plane is much smaller than the width of the waveguide then the longitudinal path length change is dominating the impact of the fabrication imperfection. The arms of an interferometer according to the invention have different TIR mirrors, which leads to different path length shifts in the two arms as a function of the processing imperfections. This will cause unwanted changes in the operation of the device, here an interferometer.

According to one embodiment of the invention, the unwanted impact of such path length changes is eliminated or reduced by using different waveguide sections in the arms so that the impact of the fabrication imperfections on the TIR mirrors is compensated by the impact of the same fabrication imperfections on those different waveguide sections. For example, one can place an identical pair of waveguide width tapers into each arm to locally increase or reduce the waveguide width (without causing any impact on the interferometer operation), and then add a waveguide section with optimized width and length in a suitable place along at least one taper to cause a phase shift that depends on the same fabrication imperfection that moves the TIR mirror position.

Figure 8A:
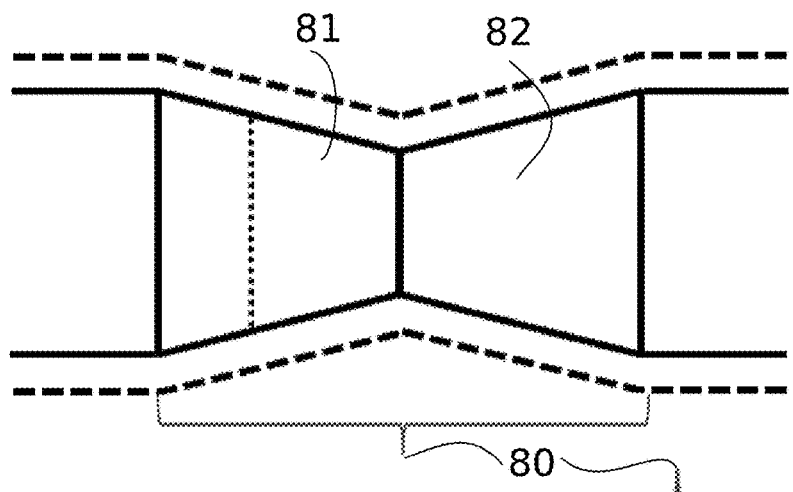
FIGS. 8A and 8B schematically illustrate two waveguide arms with identical waveguide width taper pairs and an additional waveguide section added to one of the arms to create such an optical path length difference between the arms that changes as a function of linewidth change.
Figure 8B:
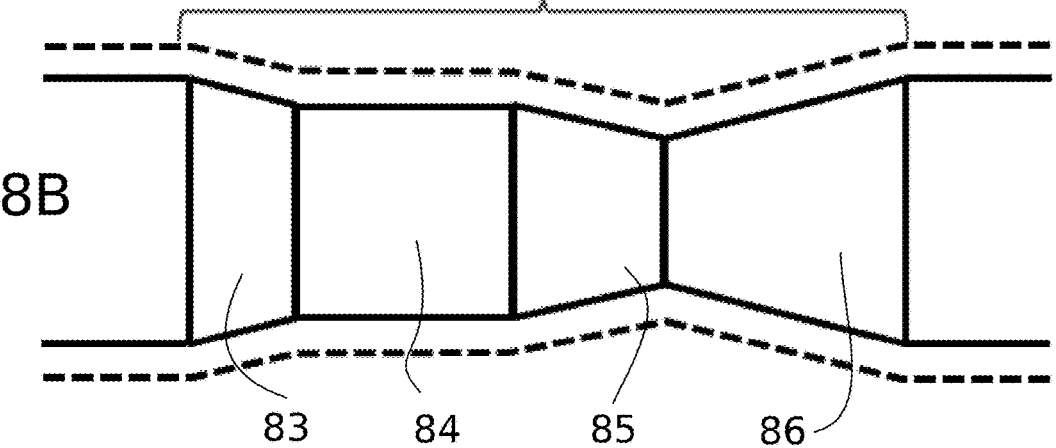

An example of an optimized waveguide section 80 with a taper pair 81, 82 is illustrated in FIG. 8A. A corresponding optimized waveguide section 80 with a straight waveguide section 84 is illustrated in FIG. 8B. The optical path length along an optical waveguide depends on the width of the waveguide and typically also on polarization. With one or multiple optimized waveguide sections 80 as shown in FIGS. 8A and 8B in one or multiple arms, it is possible to eliminate or reduce the overall variation of the path length difference between the interferometer arms as a function of the fabrication imperfections.

Those fabrication imperfections, such as linewidth changes in the waveguide, cause longitudinal path length variations in the TIR mirror elements, leading to unwanted variations in the optical path length difference between the interferometer arms. Optimized waveguide sections 80 cause an opposite and canceling variation in the optical path length difference between the different interferometer arms, preferably for both polarizations. The dotted line indicates the position in a taper pair where a straight waveguide section 84 may be inserted. Ideally, both arms have similar taper pairs, but they may have different straight waveguide sections 84 with different length and width.

According to one embodiment of the invention, at least one phase modulator is added to at least one arm of the inventive polarization splitter. It can be used to adjust or calibrate the phase difference between the arms for at least one polarization. This can be used to compensate for fabrication imperfections or to actively tune the operation of the device, for example.

Optical modulators are based on electro-optic materials based on the Pockels or Stark effect or some other effects in the material, which makes the material suitable for optical phase modulation by an external electric field, for example. An external modulating signal varies the refractive index of the material, which in turn varies the pass-through time of light in the waveguide, and thus also the phase of the light beam.

Figure 9:
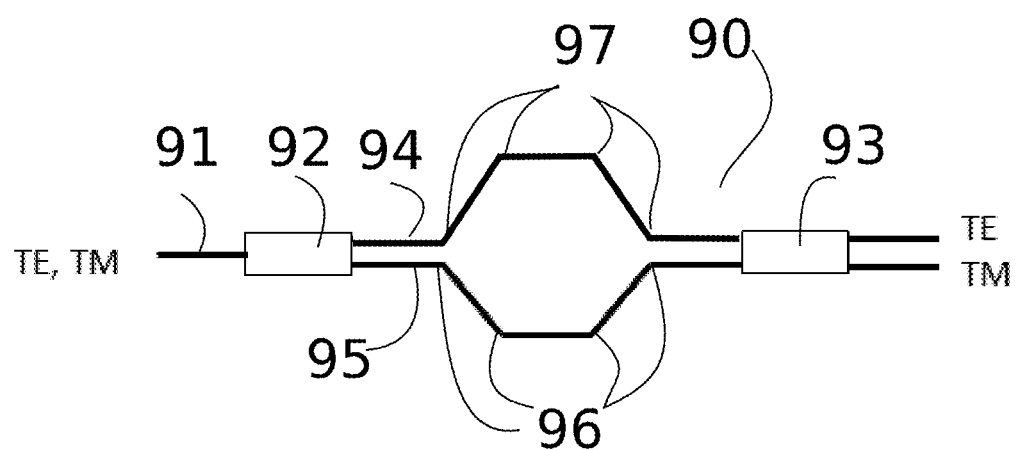
FIG. 9 shows a polarization splitter according to a further embodiment of the present invention.

FIG. 9 shows a polarization splitter according to one embodiment of the present invention, with metallized mirrors 97 in a first arm 94 and TIR mirrors 96 in a second arm 95 of the splitter. As in FIG. 2, light is first split by the optical coupler 92 into two waveguide arms 24 and 25. In this embodiment, the first arm 94 holds four metallized mirrors 97 and the second arm 95 has four TIR mirrors 96 on a single-chip SOI waveguide 90. The light in the second arm 95 of the waveguide with four TIR mirrors 96 propagates as explained in connection with FIG. 2.

The first arm 24, having four metallized mirrors 97 in the same angles and with the same distances between themselves as the TIR mirrors in the second arm. The reasons for this inventive arrangement is discussed in the following. Preferably, the series of four metallic mirrors 97 and the series of four total internal reflection mirrors 96 are processed as identical total internal reflection mirrors on the same silicon substrate. The TIR mirrors forming the series of metallic mirrors 97 are then subsequently metallized.

Linewidth variation is a main cause for alterations in the quality of processed silicon wafers, and is a manufacturing defect. Across Chip Linewidth Variation (ACLV) is a term that describes the critical dimension (CD) of uniformity across a single chip. If the CD varies too much within a chip, the electrical performance degrades and the device no longer functions as intended. The same applies to optical components, such as TIR mirrors processed on Si wafers. ACLV is a function of the manufacturing process and its magnitude is a culmination of various contributors. The major contributor to ACLV is the lithographic process that includes the photomask, optical aberrations of the scanner, and the resist process.

The reasons for these defects may be any of several of variations in: the resist layer thickness, exposure amount, the resist development process (in removing the exposed resist), etching of the mask and etching of silicon. Factors that affect these variables are the shape, the area and the location on the Si wafer of the surface to be etched. In practice, all Si wafer processing causes at least some line width variations. However, larger line width variations mainly occur between different wafers, while the changes are slow across the surface of an individual wafer. In an optical circuit, like an optical splitter processed on a chip from one wafer, the mirrors experience very accurately an identical ACLV. Variations thus take place more between different polarization splitters, not internally within a single polarization splitter.

Another reason for manufacturing defects arises from lithographic mask differences between the mirror and the waveguide. Small alignment errors may then occur. These alignment errors are typically also identical across the polarization splitter circuit. If however the mirrors are reflecting light in different directions in the circuit, the alignment errors may create phase differences in mirrors having different directions. One remedy to this is to use the same mask for both the mirror(s) and the waveguide(s) in the lithographic process. This may eliminate the alignment error, but not the linewidth problem.

Problems arise from the defects, as they cause differences in the optical paths of the arms of a polarization splitter, and thus unwanted variations in the phase differences between the two modes of polarized light propagating in the arms.

A small line width change in the mirrors of one of the arms may cumulate these phase errors to 20° for the TE mode and 200° for the TM mode, for example. In such a situation neither of the polarizations will couple cleanly only to one dedicated output port, but part of the polarized light in both modes will leak to the wrong port. In an interferometer, its operation will thus be negatively affected by a phase difference between the arms of the polarization splitter. If the phase changes in the arms are identical, no difference occurs, which renders the component insensitive to the above mentioned manufacturing errors and defects. A solution to this problem will be described below.

Ideally, if both arms would have the same amount of identical mirrors reflecting light in the same directions, the random phase errors generated in both arms would be the same, despite any line width variations or mask alignment errors. When these phase errors affect both polarizations in the same way, the do not change the polarization dependencies between the arms, and a 0° phase difference between the polarizations may be achieved in one arm and a 180° phase difference between the polarizations may be achieved in the second arm. Thereby the different polarizations interfere at the output of the polarization splitter in an optimally orthogonal manner and the two polarization modes are coupled from the same input port to two different output ports of the polarization splitter.

One way to achieve the 180° phase difference is to use TIR mirrors in a first arm and metal mirrors in a second arm. If the surface of a TIR-mirror is metallized, it does not generate a polarization-dependent phase difference. For example, if the first arm has four TIR mirrors and the second arm has four metallized TIR mirrors, a polarization-dependent phase difference occurs only in the arm without metallized TIR mirrors. When the mirrors may otherwise be identical and manufactured as described above from the same wafer, the first arm with 4 TIR mirrors will generate a 4*45=180° phase difference with respect to the second arm: A 20° phase error, for example, will have no effect, as it is the same error for both arms, due to the exact similarity of the mirrors.

Therefore, the total polarization-dependent phase shift in the arm 95 with the four TIR mirrors is approximately 180 degrees, which causes the two polarization modes TE, TM to be coupled to two different outputs at the optical coupler 93 of the interferometer 20.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting. Reference to any art is not and should not be taken as an acknowledgment or any form of suggestion that this art forms part of common general knowledge in any country.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A polarization splitter, comprising:
a first optical coupler having at least one input port which receives an input light beam, and at least two output ports at which said light beam is split into at least a first arm and a second arm, wherein first ends of said first and second arms are coupled to the at least two output ports of the first optical coupler,
a series of at least two total internal reflection mirrors coupled to at least said second arm for inducing polarization-dependent phase shifts in the light beam propagating in said second arm, and
a second optical coupler having input ports coupled to second ends of said first and second arms, wherein said second ends of said first and second arms are opposite ends compared to said first ends of said first and second arms, and the light beams of the first and second arms have a polarization-dependent phase difference of 90 or 180 degrees induced by said phase shifts, which causes a polarization-dependent coupling of light from said input port to at least one output port of the second coupler, wherein said series of total internal reflection mirrors is used to achieve a targeted polarization-dependent phase difference between said first and second arms.

2. The polarization splitter according to claim 1, wherein the series of total internal reflection mirrors are coupled to said second arm to achieve a polarization-dependent phase difference between said first and second arms, and identical waveguide bends or total internal reflection mirrors are coupled to each arm to optimize the total optical path length of said first and second arms.

3. The polarization splitter according to claim 1, wherein a series of metallic mirrors are coupled to said first arm.

4. The polarization splitter according to claim 3, wherein said series of metallic mirrors and said series of total internal reflection mirrors are processed as identical total internal reflection mirrors from the same silicon substrate, and wherein the mirror forming said series of metallic mirrors are metallized total internal reflection mirrors.

5. The polarization splitter according to claim 1, wherein said series of total internal reflection mirrors coupled to said second arm comprises four mirrors, each mirror causing a 45 degree phase shift between the s and p polarizations of the light beam propagating in said second arm.

6. The polarization splitter according to claim 1, wherein the total optical path length difference between the two arms is no more than 360 degrees.

7. The polarization splitter according to claim 1, wherein the polarization splitter is a 1×2 or a 2×2 Mach-Zehnder interferometer where two polarization modes, a parallel (p) polarized mode and a perpendicular (s) polarized mode, are coupled from the same input port to two different output ports.

8. The polarization splitter according to claim 1, wherein at least one of the first arm or the second arm comprises at least one phase modulator to adjust or calibrate the phase difference between the arms for at least one polarization.

9. The polarization splitter according to claim 1, wherein the polarization splitter further comprises optical waveguides that form a photonic integrated circuit.

10. The polarization splitter according to claim 1, wherein at least one tapered waveguide section is included in at least one arm to at least partly compensate for fabrication imperfections on the total internal reflection mirrors and the resulting impact on path length differences between different arms of the polarization splitter.

11. A method for splitting polarization, comprising the steps of:
feeding an input light beam to at least one input port of a first optical coupler having at least two output ports at which said light beam is split into at least a first and a second arm, wherein first ends of the first and second arms are coupled to the at least two output ports of the first optical coupler,
inducing polarization-dependent phase shifts to the light beam propagating in said second arm by a series of at least two total internal mirrors in said second arm, and
receiving light beams coupled from second ends of said first and second arms to input ports of a second optical coupler, wherein said second ends of said first and second arms are opposite ends compared to said first ends of said first and second arms, said light beams having a polarization-dependent phase difference of 90 or 180 degrees induced by said phase shifts causing a polarization-dependent coupling of light from said input ports to at least one output port of the second coupler,
wherein said series of total internal reflection mirrors is used to achieve a targeted polarization-phase difference between said first and second arms.

12. The method according to claim 11, wherein said series of total internal reflection mirrors are coupled to said second arm, and identical waveguide bends or total internal reflection mirrors are coupled to each arm to optimize the total optical path length of said first and second arms.

13. The method according to claim 11, wherein a series of metallic mirrors is coupled to said first arm.

14. The method according to claim 13, wherein said series of metallic mirrors and said series of total internal reflection mirrors are processed as identical total internal reflection mirrors from the same silicon substrate, and wherein the mirror forming said series of metallic mirrors are metallized total internal reflection mirrors.

15. The method according to claim 11, wherein said series of total internal reflection mirrors comprises four total internal reflection mirrors coupled to said second arm, each mirror causing a 45 degree phase shift between the s and p polarizations of the light beam propagating in said second arm.

16. The method according to claim 11, wherein the total optical path length difference between the arms is selected to be no more than 360 degrees.

17. The method according to claim 11, wherein two polarization modes, a parallel (p) polarized mode and a perpendicular (s) polarized mode, are coupled from the same input port to two different output ports of a 1×2 or a 2×2 Mach-Zehnder interferometer.

* * * * *